(12) United States Patent
Mitchell et al.

(10) Patent No.: US 7,622,040 B2
(45) Date of Patent: Nov. 24, 2009

(54) FINE BUBBLE AIRLIFT DEVICE

(75) Inventors: William S. Mitchell, McKenzie, TN (US); Roland Schmidt, Macon, MS (US); Roy Trence Johnson, McKenzie, TN (US)

(73) Assignee: Tekni-Plex, Inc., Somerville, NJ (US)

( * ) Notice: Subject to any disclaimer, the term of this patent is extended or adjusted under 35 U.S.C. 154(b) by 106 days.

(21) Appl. No.: 11/478,875

(22) Filed: Jun. 30, 2006
(Under 37 CFR 1.47)

(65) Prior Publication Data
US 2008/0000823 A1    Jan. 3, 2008

(51) Int. Cl.
*E02B 15/04* (2006.01)
*C02F 1/74* (2006.01)
*B01F 3/04* (2006.01)

(52) U.S. Cl. .............. 210/242.2; 210/170.05; 210/170.09; 210/220; 261/120; 261/124

(58) Field of Classification Search ........... 210/150, 210/170.02, 170.05, 170.09, 198.1, 220, 210/242.1, 242.2; 239/57; 138/174, 128, 138/153, 141; 261/120, 121.1, 123, 124, 261/125, 126, DIG. 70
See application file for complete search history.

(56) References Cited

U.S. PATENT DOCUMENTS

| | | | | |
|---|---|---|---|---|
| 2,722,237 A | * | 11/1955 | Rosel | ................... 138/118 |
| 4,690,756 A | * | 9/1987 | Van Ry | ................. 210/170.06 |
| 4,780,023 A | * | 10/1988 | Dalton | ................... 239/276 |
| 4,906,359 A | * | 3/1990 | Cox, Jr. | ................ 210/170.02 |
| 4,917,832 A | | 4/1990 | Marcum et al. | |
| 5,326,475 A | * | 7/1994 | Kent | ................... 210/747 |
| 5,811,164 A | | 9/1998 | Mitchell | |
| 5,816,742 A | * | 10/1998 | Cordewener | ................. 405/43 |
| 5,938,983 A | * | 8/1999 | Sheaffer et al. | ......... 210/221.2 |

FOREIGN PATENT DOCUMENTS

| | | |
|---|---|---|
| DE | 265161 | 2/1989 |
| GB | 2322565 | 9/1998 |
| GB | 2407810 | 5/2005 |
| WO | 01/85623 | 11/2001 |

* cited by examiner

*Primary Examiner*—Matthew O Savage
*Assistant Examiner*—Lucas Stelling
(74) *Attorney, Agent, or Firm*—Lerner, David, Littenberg, Krumholz & Mentlik, LLP

(57) ABSTRACT

The present invention relates to an aeration device for use in a liquid medium. The device includes a housing adapted to float within the medium such that a top portion thereof remains above a top surface of the medium. The housing has a bottom portion and an open side portion. The device further includes a hose affixed to the bottom portion of the housing substantially parallel to the surface of the liquid medium. The hose has a wall with a plurality of pores formed therein. The device further includes a gas-supplying pipe affixed to the hose and means for supplying a gas to the pipe such that the gas passes through the pipe and into the hose.

23 Claims, 5 Drawing Sheets

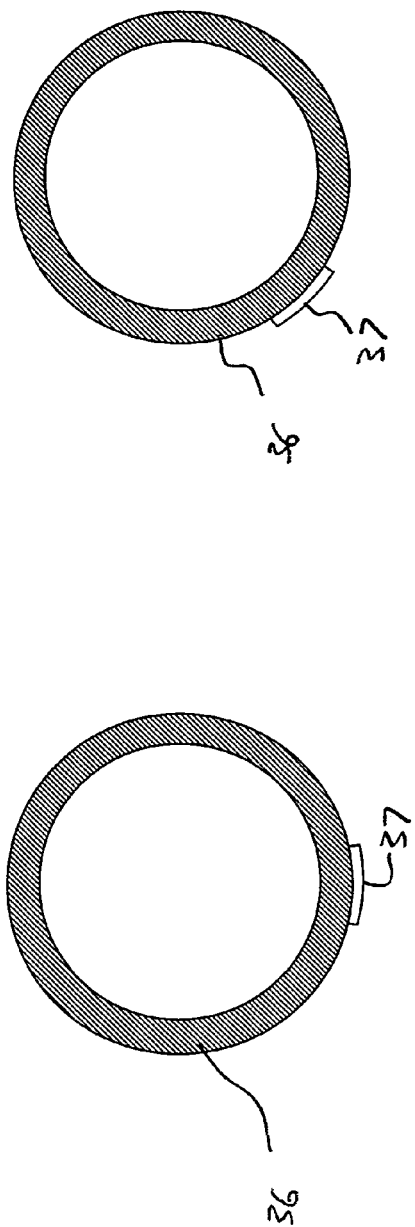
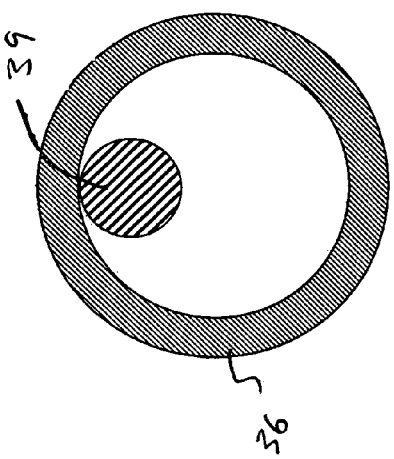

FINE BUBBLE AIRLIFT DEVICE

BACKGROUND OF THE INVENTION

The present invention relates to an apparatus for aerating and circulating a liquid and, in particular, water in a pond.

Various devices exist for the introduction of air bubbles into a mass of liquid, typically water. Such devices have numerous applications which encompass areas such as aquaculture, including culturing and raising fish in controlled environments (known generally as fish farming), waste water management and the like. Other uses are generally known in the art. Such devices include what are generally known as surface aeration devices and air lift devices.

Surface aeration devices in the art use a form of paddle wheel to agitate the water near the surface thereof. This causes bubbles of ambient air to become trapped in the water, some of which are absorbed into the water. The paddles further force the aerated water away from the device and draw additional water toward the device to be aerated. Surface aerators are inefficient, requiring a large energy input relative to the volume of water aerated. They also have several moving parts which can require frequent maintenance.

Air lift devices have been known for many years and essentially operate by supplying air bubbles into water at a predetermined depth below the surface. Some of this air is absorbed into the water, which causes the water to become less dense and rise toward the surface. The rising of the water causes circulation thereof, which distributes the aerated water and brings additional water toward the device for aeration. Water is aerated in an air lift device by the use of a diffuser. Many forms of diffusers have been in existence for years and typically include a porous body through which air or another gas such as nitrogen or oxygen is forced. When the diffuser is submerged in water, the movement of gas through the device causes bubbles to emerge from the pores and into the water.

Known diffusers include ceramic dome diffusers and porous rubber hoses. However, it has been found that dome diffusers are difficult to maintain, lack durability, and are more costly to manufacture in mass production.

Porous rubber hoses have been used for aeration. However, a key objection to off-the-shelf porous rubber hoses and other porous rubber aeration products is that, after a cure period in water, the hose requires high air pressure delivery systems because the rubber particles unsatisfactorily swell in water thereby decreasing pore diameter. Decreasing pore diameter causes increased flow resistance and uneven aeration patterns in long runs of tubing become more problematic as the pipes age in their environment. Further problems associated with the manufacture of porous aeration pipe utilizing previous methods have included irregularly shaped pipe walls, inconsistent porosity, and ineffective micropore size and wall thickness producing inconsistent and unreliable aeration rates.

Porous hoses are available which are made from thermoformable polymeric material, such as polyvinyl chloride (PVC) and polyethylene (PE). These types of porous hoses are formed by dispersing air bubbles into the thermoformable material while in a molten state, thereby forming a foam-like material which is then extruded into the shape of a hose, leaving the air bubbles therein when the structure freezes. In such a structure, some of the air bubbles will create pores which extend from the inside of the hose structure to the outside thereof, providing a path for gas to diffuse into water outside the hose. However, the air bubbles are irregularly distributed throughout the body of the hose, leading to irregular size and placement of the pores. For example, some air bubbles may be completely contained within the wall of the hose or may only be exposed to one side of the wall, neither of which creates a pore. Additionally, it may take multiple bubbles being linked together to actually form a passage completely through the hose, which increases the resistance of the path. Both of these conditions can lead to inefficiencies, which can reduce the efficacy of an air lift which employs such a diffuser.

Generally, the size of the air bubbles which are diffused into water during aeration thereof can be varied by providing a diffusion device with smaller or larger pores formed therein, smaller pores producing smaller bubbles. Some known devices favor the use of smaller bubbles, because smaller bubbles are absorbed more readily into water. However, for reasons described above, many known devices for diffusing fine air bubbles into water are expensive or inefficient to operate. Other known devices favor the use of larger, more coarse bubbles because such bubbles travel through water at a higher velocity.

Therefore, there exists a need for a device which is useful for aerating a large volume of liquid that does so efficiently while utilizing a less-expensive or more reliable diffusion device that provides for adequate absorption of gas into the liquid medium.

SUMMARY OF THE INVENTION

The present invention relates to a device for use in a liquid medium. The device includes a housing adapted to float within the medium such that a top portion thereof remains above a top surface of the medium. The housing has a bottom portion and an open side portion. The device further includes a hose affixed to the bottom portion of the housing substantially parallel to the surface of the liquid medium. The hose has a wall with a plurality of pores formed therein. The plurality of pores has an average diameter of between about 0.001 inches and about 0.004 inches and is spaced apart substantially evenly throughout the length of the hose. The device further includes a gas-supplying pipe affixed to the hose and means for supplying a gas to the pipe such that the gas passes through the pipe and into the hose.

The means for supplying gas to the pipe may include a blower located outside of the liquid medium. The blower can be connected to the pipe by a flexible hose having a first and second end, the first end being affixed to an outlet portion of the blower and the second end being affixed to an inlet portion of the pipe.

A further embodiment of the present invention is directed toward a device for use in a liquid medium. The device includes a housing adapted to float within the medium such that a top portion thereof remains above a top surface of the medium. The housing has a bottom portion and an open side portion. The device further includes a pipe affixed near the open bottom portion of the housing. The pipe forms a rectangle having a first side and a second side. A plurality of hose portions, each having a first end and a second end, the first ends of the plurality of hose portions being affixed to the first side of the rectangle of pipe, and the second ends of the plurality of hose portions are affixed to the second side of the rectangle of pipe, such that the gas can flow into the plurality of hose portions from the pipe at the first end and the second end of the plurality of hose portions. Each of the plurality of hose portions further has a wall with a plurality of pores formed therein, the plurality of pores having an average diameter of between about 0.001 inches and about 0.004 inches, and being spaced apart substantially evenly throughout a length of the hose. Each of the plurality of hoses is formed from thermoset polymer particles distributed within a matrix of a thermoplastic binder material. The device further includes means for supplying a gas to the pipe such that the gas passes through the pipe and into the plurality of hoses.

BRIEF DESCRIPTION OF THE DRAWINGS

The present invention will be better understood on reading the following detailed description of nonlimiting embodiments thereof, and on examining the accompanying drawings, in which:

FIGS. 5a and 5b are cross-section views of a hose portion having an air-impermeable stripe formed thereon; and FIG. 6 is a cross section view of a hose portion having an internal support included therein.

DETAILED DESCRIPTION

Figure 1:
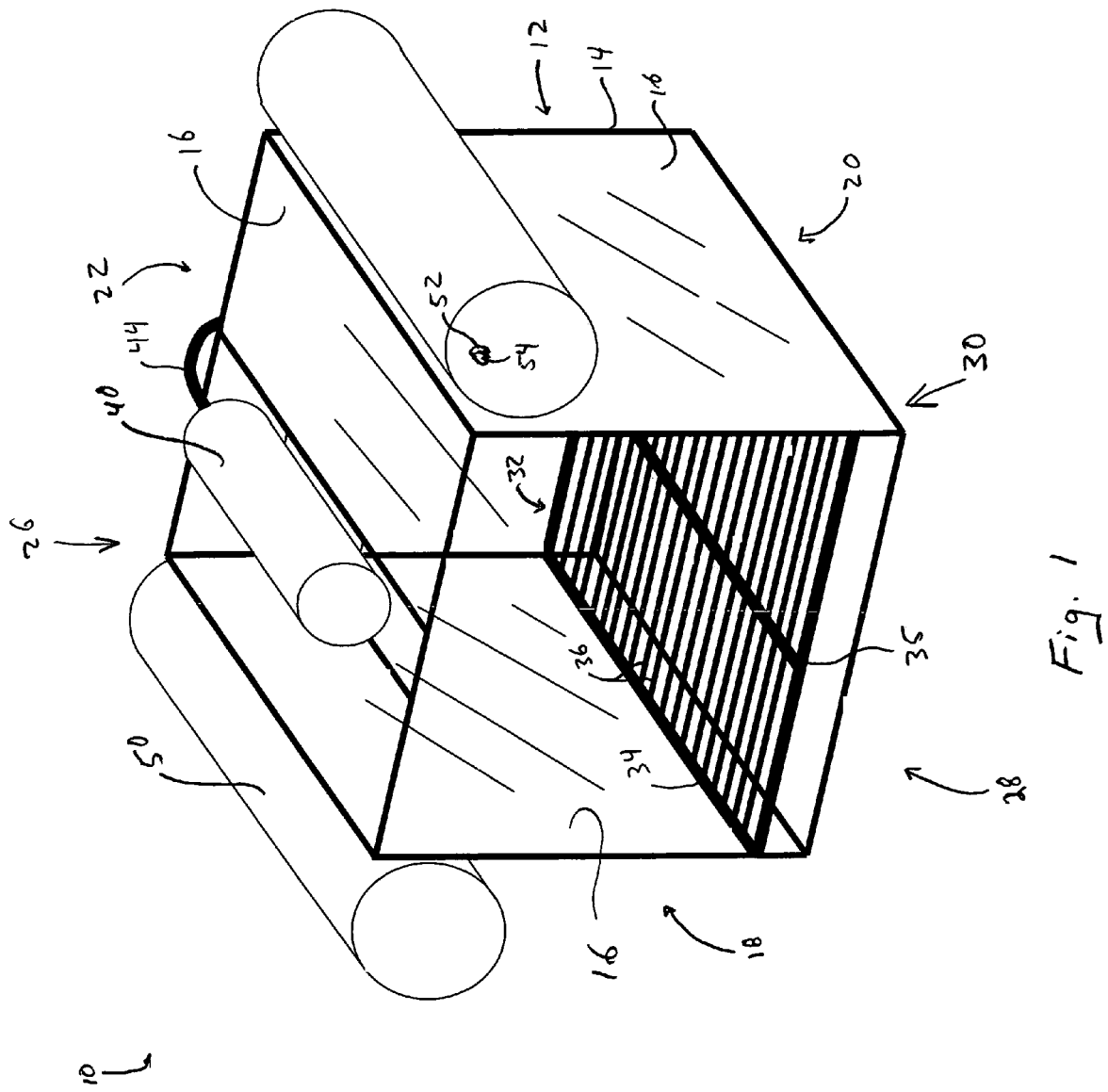
FIG. 1 is a front perspective view of an aeration device according to an embodiment of the present invention.

Referring now to the figures, wherein like reference numerals refer to like features, there is shown in FIG. 1 a device 10 according to an embodiment of the present invention. The device has a housing 12 including a frame 14. Frame 14 may be made of any material that is strong enough to support the weight of the remaining components of the device 10 and will not corrode or otherwise degrade in the presence of water, including salt water or water with waste materials of other chemicals dissolved therein. Preferably, support members are made from marine-grade aluminum or another similar metal. Support members are preferably assembled by welding or other known methods, including the use of screws, bolts, rivets or the like.

Frame 14 is structured to provide the desired shape for housing 12. The structure of frame 14 shown herein is in the shape of a rectangular prism, although other acceptable shapes for aeration devices, such as cylinders, are possible. The use of these designs, as well as other variations of the design shown in the figures, would be understood by those having skill in the art. In the design of housing 12 shown in FIGS. 1 and 2, side walls 16 are affixed to frame 14 on the right 18, left 20 and back 22 sides thereof. As used herein, the terms top, bottom, left, right, front and back are used only for convenience in referring to the geometric frame of reference used in the figures, and are not intended to limit the scope of the invention. Side walls 16 on right, left and back sides 18, 20 and 22 are preferably made from a material having similar properties to those of frame 14, and are further preferably made from marine-grade aluminum. Side walls 16 can be affixed to frame 14 by conventional means, including screws, bolts, rivets, adhesive or welding. If any fastening devices, such as screws, are used for connecting various parts of device 10 together, such fastening devices should be made from commercial grade stainless steel.

Front 28, top 26, and bottom 30 of housing 12 are left substantially open. This allows the device, during operation, to draw in water from bottom 30 of housing 12 and to expel water through at least a portion of front 28 thereof. Such operation is described in further detail below.

Grid 32 is secured within housing 12 of device 10 near the bottom 30 thereof. Grid 32 includes a pipe 34 and at least one air-permeable hose 36 in fluid communication therewith. Preferably, hose 36 projects in a substantially perpendicular direction from pipe 34. Further preferably, hose 36 extends in a direction substantially parallel to the surface of the liquid medium in which the device 10 is used, although other arrangements are possible. Pipe 34 is preferably made from a material that does not corrode or otherwise degrade in the presence of water, including water with salt or other chemicals dissolved therein. One example of a suitable material for pipe 34 is PVC, preferably marine-grade PVC.

Hose segments 36 have a gas-permeable wall including a plurality of micropores extending through the wall 38 thereof and having an average diameter in the range of about 0.001 inches to about 0.004 inches. Such a hose 36 is preferably of the type disclosed in U.S. Pat. No. 5,811,164, issued Sep. 22, 1998, to Mitchell ("the '164 Patent"), the disclosure of which is incorporated herein by reference thereto in its entirety. This type of hose 36 is made from thermoset polymer particles in a matrix of a thermoplastic binder material, which may be made according to a method described in the '164 Patent. Preferably, the thermoset polymer particles have a mesh size of about 60 to 140 mesh and, more preferably, of about 80 to 100 mesh. Further, it is preferred that the micropores in wall 38 of hose 36 have a uniformity of at least about 80% and more preferably of at least about 90%. Additional variations of a similar hose are further described in a co-pending U.S. Provisional Patent Application entitled "Aeration Device For Use As A Diffuser," filed on May 8, 2006, and having an 60/798,611 the disclosure of which is incorporated herein by reference thereto in its entirety.

Additionally, a hose of the type described in the '164 patent can be further adapted to include a portion thereof which is air impermeable. Such a portion may be generally in the form of a longitudinal stripe that extends along the length of the hose section. This stripe may be formed from polyethylene, which may be applied to hose 36 during formation thereof using a cold-extrusion process. Additional materials which can be used to form stripe 37 are polyvinylchloride, ABS and polypropylene. Further a latex or similar material may be applied after formation of hose 36 by painting. The air impermeable stripe is preferably of a width between 0.10 and 1 inch and is more preferably about 0.25 inches in width. When a hose of this type, having an air impermeable stripe formed thereon is used in a device of the present invention, the stripe may be oriented in a downward direction with respect to the remaining hose (as shown in FIG. 5a). This may be advantageous because, when a device having a hose that is air permeable around the entire circumference thereof is used in such a device, the bubbles which emanate from the lower portion of the hose tend to coalesce with bubbles emanating from the upper portions of the hose as these bubbles pass along the hose body. Such coalescence results in the production of coarse bubbles, which is disadvantageous. Accordingly, the inclusion of stripe 37 on hose portion 36 may result in the production of a greater proportion of fine bubbles.

Additionally, the air impermeable stripe 37 can be positioned in an offset fashion, as illustrated in FIG. 5b. In such an arrangement, stripe 37 is preferably positioned at a point offset from the bottom of the hose by between 5 and 45 degrees in either direction. By doing as such, the hose can provide for additional directional flow of the liquid medium. For example, as illustrated in FIG. 5b, stripe 37 is directed toward the back 22 of the device. This results in a greater proportion of air bubbles being produced on the front portion of the hose, as compared to the back portion thereof, which tends to direct the liquid toward the front of the device and tends to draw more of the liquid from the rear of the device.

It has been found that a hose of the type described in the '164 Patent is able to diffuse air into water in an amount comparable to that of a diffuser which produces much larger air bubbles without requiring a greater power input for the blower. In other words, there is a relatively low amount of head loss in the hose of the '164 Patent. Additionally, the diffusion hose of the '164 Patent has a lower head loss than other known fine bubble diffusers. Furthermore, it has been found that fine air bubbles are more readily absorbed into water per volume of air compared to large, or coarse, air bubbles. This increased absorption is due to the increased surface area of the smaller bubbles per unit of volume of air in water. Increased surface area increases absorption of air into water because air is absorbed into water only at the surface of a bubble. The relatively low head-loss of the diffusion hose of the '164 Patent combined with the high level of absorption of air (or other gasses) into water (or other liquids) leads to a high efficiency for the hose, making it particularly suitable for use as a hose 36 in the device 10 of the present invention. However, other types of diffusion devices may be used.

Preferably, grid 32 includes a plurality of hose portions 36 affixed to pipe 34 which is preferably in the form of a rectangular frame. In such an arrangement, hose portions 36 are coupled to pipe 34 at both ends such that gas flowing through pipe 34 can enter hose 36 from either side. In the particular arrangement show in FIG. 1, pipe 34 is configured as a rectangle secured near the bottom 30 of housing 12 such that it forms a plane that is parallel to the plane formed by bottom 30 of housing 12. Preferably, grid 32 is about eight feet wide (measured from the right side 18 to the left side 20) and about four feet deep (measured from the front 28 to back 22). However, the size of grid 32 can be varied in accordance with the volume of liquid to be aerated. Further, it may be necessary to alter the preferred dimensions in order to fit grid 32 within housing 12. In this arrangement, hose portions 36 extend transversely across pipe 34 from near the left side 18 of the housing 12 to near the right side 20 of the housing 12. Additional arrangements, including one in which hose portions 36 extend transversely from front 29 to back 22 of housing 12, are possible and would be understood by those with skill in this art. Grid 32 may also include support 33 for hose portions 36 in order to prevent excess movement or sagging of hose portions 36 during use of device 10. Preferably, support 33 extends over both the top and bottom of each hose portion 36. Additionally, it is preferred that at least one support 33 is used for each 24 inches of length for hose portions 36.

Hose portions 36 are preferably affixed to pipe 34 using standard ½-inch NPT barbed inserts. Further, hose portions are preferably spaced along the length of pipe 34 at intervals of about 2 inches from center to center. Additionally, as shown in FIG. 6, an internal support 39 can be placed inside of each hose portion 36. Internal support 39 can be made from any material having a sufficient rigidity to provide support for the hose portion 36 along the length thereof. Internal support 39 preferably has a length such that it extends into the fittings or other such structures by which hose portions 36 are affixed to grid 32. Accordingly, internal supports 39 are preferably sized so as to fit within the selected attachment between hose portions 36 and grid 32. Suitable materials for internal support 39 include polyvinylchloride, ABS, stainless steel, aluminum or any other material with sufficient strength and/or rigidity to support hose portions 36. Furthermore, although internal support 39 is shown in FIG. 6 as being round, additional shapes are possible, including triangular, square or that of an I-beam.

Figure 3:
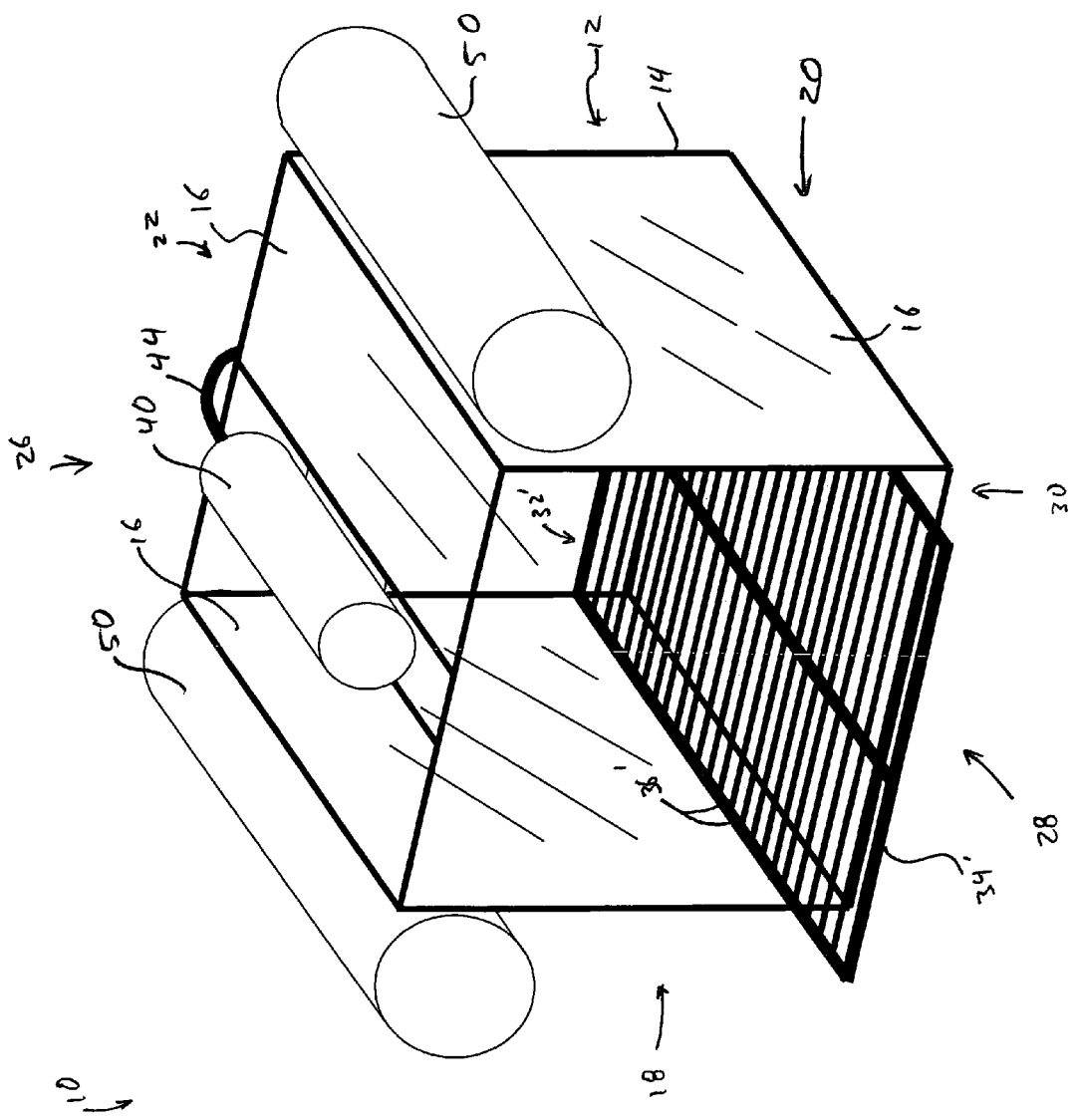
FIG. 3 is a front perspective view of an aeration device according to an alternative embodiment of the present invention.

As shown in FIG. 3, in an alternative embodiment of the device 10 of the present invention, pipe 34' can be formed in the shape of a rectangle that extends beyond the front 28 of the housing 12. In such an arrangement, a portion of the frame 14 to which grid 32' is secured can also extend beyond the remainder of the front 28 of housing 12 in order to provide support for grid 32'.

Figure 2:
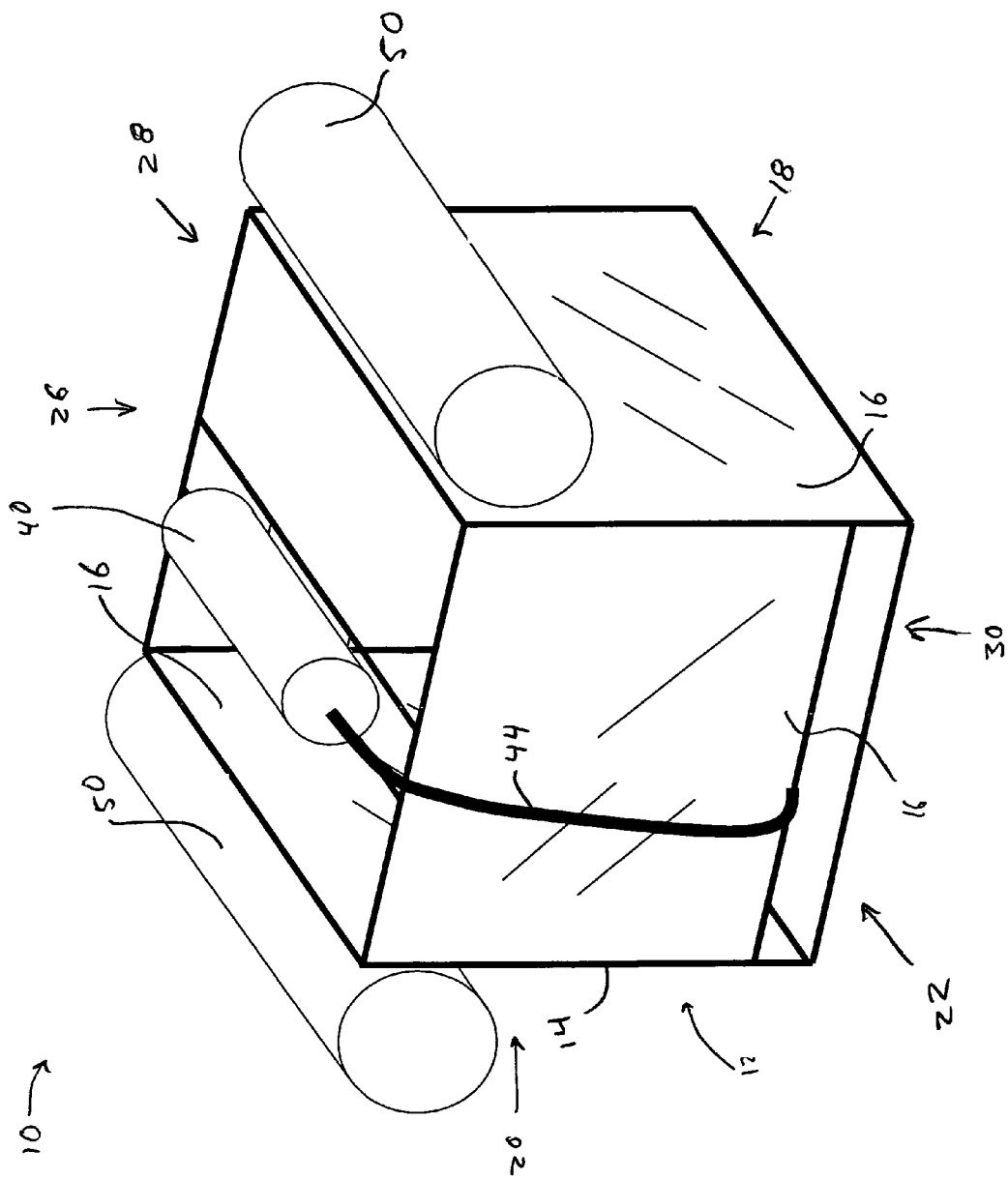
FIG. 2 is a rear perspective view of an aeration device according to an embodiment of the present invention.

Returning now to the embodiments shown in FIGS. 1 and 2, pipe 34 is connected to a gas source 40, which is preferably in the form of a pump or blower. More preferably, gas source 40 is a regenerative blower. Further, it is preferred that gas source 40 be of a type which does not require the use of oil, as this could cause oil to travel into hose portions 36, which can cause damage thereto. A pump or blower is used in this arrangement to supply pressurized ambient air to grid 32, which is then diffused into the liquid medium through hoses 36. Preferably, the gas source 40 supplies gas to the hose portions 36 at a rate of between ⅒ and 10 [please provide a range] cubic feet per minute (CFM), per linear feet of hose used in grid 32. More preferably, the gas source 40 supplies gas to hose portions 36 at a rate of about 0.5 CFM per linear foot of hose. As shown in FIGS. 1 and 2, gas source 40 is affixed to top 26 of housing 12 and is connected to pipe 34 using a flexible tube 44 at an inlet portion 42 thereof. Flexible tube 44 is preferable what is known as a high-pressure fertilized solution hose, although other types of flexible tubes may be suitable. In order to provide for dissipation of any excess heat added to the air by the operation of gas source 40, a section of metal tubing 45 (FIG. 4) may be affixed between the outlet portion of the gas source and the flexible tube 44. Preferably, the section of metal tubing 45 has a diameter of about 2 inches and a length of between 1 foot and 4 feet. More preferably, the section of metal tubing 45 has a length of about 18 inches. The section of metal tubing may be made from galvanized steel or any other similar metal. If a pump or blower is used as gas source 40, it is necessary that the pump or blower be located outside of the liquid medium, but it is not necessary that the pump or blower be affixed to top 26 of housing 12. Rather, the pump or blower can be located anywhere outside of the water, where it can be connected to inlet portion 42 of grid 32 using flexible tube 44. Furthermore, to reduce the likelihood that debris from within the ambient air becomes entrapped in the pores of hose portions 36, an air filter (not shown) may be used in conjunction with gas source 40.

Floats 50 are affixed to housing 14, preferably on at least two sides (for example, left 18 and right 20 sides as shown in FIG. 1) near the top 26 thereof. Floats 50 are designed and positioned on housing 12 in order to maintain device 10 at an appropriate level within the liquid medium. Generally, an appropriate level for device 10 is such that grid 32 is between about 20 and 55 inches below the surface of the liquid medium in which device 10 is used. The positioning of grid 32 relative to the surface of the liquid medium will depend not only on the positioning of floats 50, but will also depend on the dimensions of housing 12. For example, in the device 10 shown in FIG. 1, the vertical centerline of grid 32 is spaced below the top 24 at a distance of approximately 48 inches, and the center of buoyancy for floats 50 in water is approximately 1 inch below top 24 of housing 12; however, these dimensions can vary. The dimensions of device 10, including the depth of frame 14 and the positioning of floats 50 relative to frame 14 should be such that grid 32 is at least 24 inches below the surface of the liquid medium. Furthermore, housing 12 of device 10 should not rest on the bottom surface of the pond or other location where it is used.

Floats 50 shown in FIG. 1 are in the form of hollow cylinders which are impermeable to air and water; however, various other types of floats are possible, including those made of foam or the like. Floats may also include ports 52 formed therein which are sealed with removable plugs 54. Ports 52 allow for the introduction of water or other fluids into floats 50 in order to adjust the center of buoyancy of floats 50, which allows the overall position of device 10 within the liquid medium to be manipulated. For example, by adding water, the center of buoyancy of the floats 50 is raised, thereby lowering device 10 with respect to the surface of the liquid medium. The size and positioning of floats 50 will vary depending on the composition of the liquid medium and the size and weight of device 10. Additionally, a float 50 may be affixed to the back 22 of the housing to provide additional buoyancy, if necessary.

Figure 4:
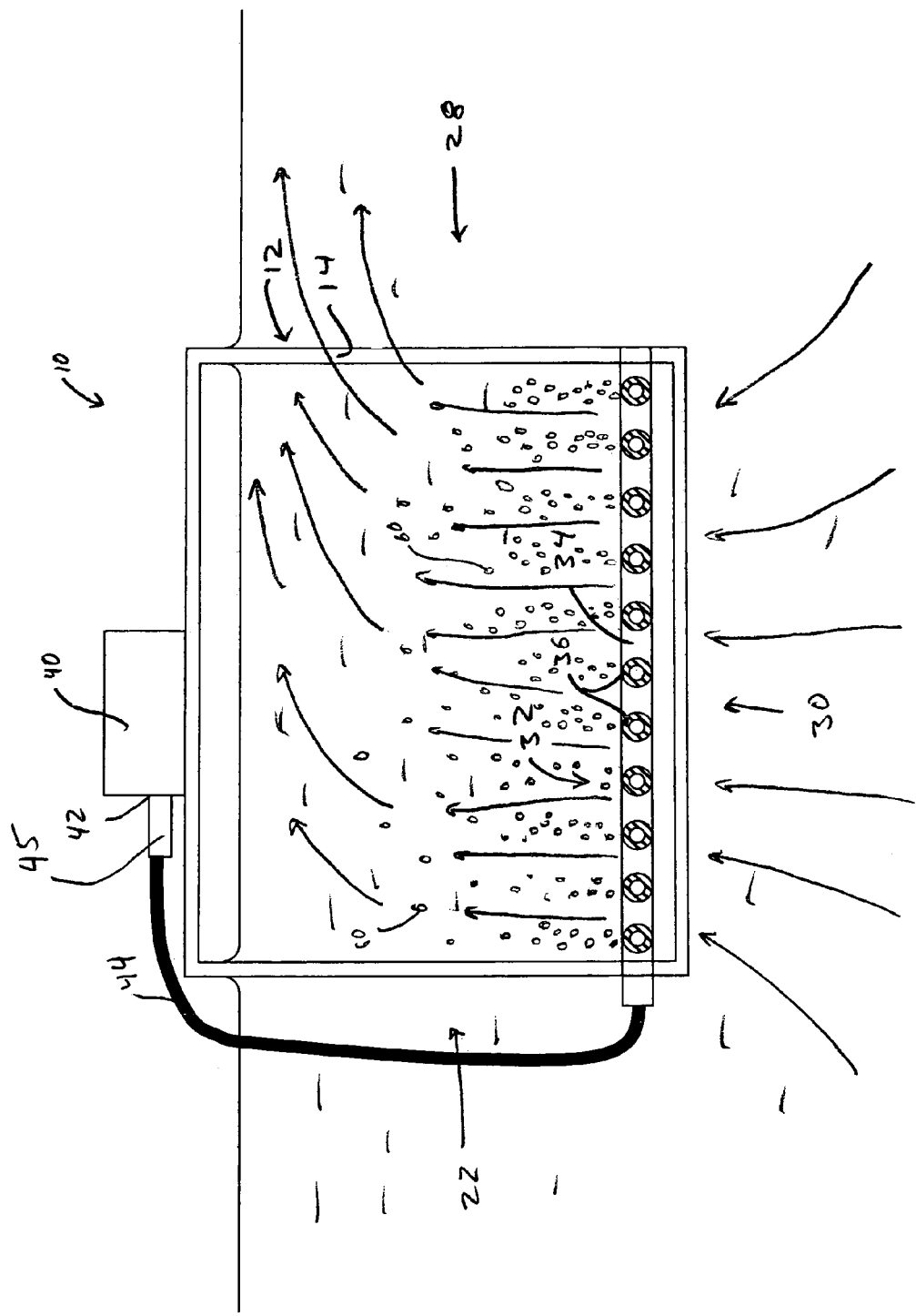
FIG. 4 is a cross-section view of an aeration device according to an embodiment of the present invention.

In operation of device 10, as illustrated in FIG. 4, a gas source, which is preferably in the form of a regenerative blower, forces gas, which is preferably ambient air, through tube 44 and into pipe 34. The gas then flows into hoses 36 and the pressure of the system increases until it reaches a level sufficient to force the gas through the micropores within the walls 38 of the hoses 36. This causes the formation of a large number of small gaseous bubbles 60 within the liquid medium adjacent to the hoses 36. Because the gas is less dense than the liquid medium (as is the case when air is diffused into water), the bubbles rise away from the hose. As additional air is continued to be forced into the system, additional bubbles are formed in the liquid medium and rise away from the hoses 36. The surface tension of the liquid medium causes some of the liquid medium to rise with the bubbles, thereby causing circulation of the liquid medium, as illustrated in FIG. 4. Additionally, as some of the gas within the bubbles is absorbed into the liquid, this aerated liquid rises toward the top of the liquid. As additional liquid rises upward, the pressure of the water near the top of the device increases, forcing at least some of the water out of the open front 28 of the housing 12.

The movement of liquid vertically away from hose portions 36 and out of front 28 of device 10 creates a vacuum effect in the liquid below hose portions 36, which serves to draw liquid upward and toward hose portions 36 from below device 10. The device of the present invention circulates enough liquid (particularly water) therethrough to draw liquid from at least 10 feet below the surface, depending on the properties of the liquid. This is more than sufficient for most applications, particularly aquaculture and waste-water treatment, as water depths in these applications is typically between 5 and 7 feet.

As the operation of the device is continued, the aerated liquid is continued to be forced away from the device by the liquid that rises away from the hose portions 36 and out of front 28 of housing 12. As the vacuum force created by this circulation continues to draw water away from the bottom of the medium, at least some of the aerated water is drawn downward from the upper surface of the liquid medium. After a sufficient period of operation, which depends on the volume of the medium and the output of the device 10, the entire liquid medium can be aerated by device 10. For example, a device 10 according to an embodiment of the invention, wherein grid 32 includes a 48 inch by 48 inch rectangle of pipe 43 with hose portions 36, each having a diameter of approximately 1.000 [please confirm] inches, spaced along the length of the rectangle of pipe 34 at 2 inch intervals (from center-to-center of adjacent hoses 36), is sufficient to aerate a pond containing water and having an average depth of 6 feet and an average overall area of 1 to 3 acres [please provide dimensions].

Larger volumes of water (or other liquid medium) can be aerated using either multiple devices as described above or by using a lager device. Typically, such a larger device will have a grid that is about 48 inches from front 28 to back 22, as described above, but has a greater width, which can be up to 16 feet. The housing 12 of such a device will vary in accordance with variations in the size of grid 32.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A device for the aeration and circulation of a liquid medium comprising:

a housing adapted to float within the liquid medium such that a top portion thereof remains above a top surface of the liquid medium, the housing having a substantially open bottom having a predetermined area, at least one open side portion having an area substantially corresponding to said predetermined area of said open bottom, said at least one open side portion extending substantially continuously from said substantially open bottom portion to said top portion adjacent to said top surface of the liquid medium, and a plurality of remaining closed side portions defining the remainder of said housing and extending substantially continuously from said substantially open bottom to said top portion, thereby defining a substantially open interior portion defined by said plurality of remaining closed side portions of said housing, whereby said liquid medium can be caused to flow into said substantially open bottom and directly out of said at least one open side portion of said housing to create a substantial circulation of said liquid medium;

a plurality of hose portions affixed to the bottom portion of the housing substantially parallel to the surface of the medium thus providing an array of hose portions substantially corresponding to said predetermined area of said substantially open bottom, said array of hose portions having a wall with a plurality of pores formed therein, the plurality of pores having an average diameter of between about 0.001 inches and about 0.004 inches and being spaced apart substantially evenly throughout a length of the hose;

a gas supply pipe affixed to said base; and means for supplying a gas to said gas supply pipe.

2. The device of claim 1, wherein the hose is formed from thermoset polymer particles distributed within a matrix of a thermoplastic binder material.

3. The device of claim 2, wherein the thermoset polymer particles have a mesh size of between about 10 and 200.

4. The device of claim 1, wherein the wall of the hose has a substantially uniform porosity throughout a thickness of the wall.

5. The device of claim 4, wherein the porosity of the wall has a uniformity of at least 90%.

6. The device of claim 2, wherein the thermoset polymer particles comprise a rubber.

7. The device of claim 6, wherein the rubber is cured crumb rubber.

8. The device of claim 2, wherein the thermoplastic binder material is polyethylene.

9. The device of claim 8, wherein the polyethylene is linear low density polyethylene.

10. The device of claim 2, wherein the hose comprises about 80% by weight the thermoset polymer material and about 20% by weight the thermoplastic binder material.

11. The device of claim 2, wherein the hose includes an air impermeable portion extending in a longitudinal direction along a length thereof.

12. The device of claim 11, wherein the air impermeable portion is in the form of a stripe having a width between 0.10 inches and 1 inches.

13. The device of claim 12, wherein the stripe is formed by cold extrusion of PVC onto the hose.

14. The device of claim 2, further including a hose support member disposed within the hose and extending at least the entire length thereof, the hose support member being somewhat rigid so as to prevent sagging of the hose.

15. The device of claim 1, wherein the plurality of hose portions is distributed substantially evenly along the bottom portion of the housing.

16. The device of claim 15, wherein the distance from a center of one of the plurality of hose portions to an adjacent one of the plurality of hose portions is about 2 inches.

17. The device of claim 1, wherein the gas supply pipe forms a rectangle having a first side and a second side, each of the plurality of hose portions being affixed at a first end thereof to the first side of the rectangle and at a second end thereof to the second side of the rectangle such that the gas can flow into the hose from the pipe at both the first end and the second end of the plurality of hose portions.

18. The device of claim 1, wherein the means for supplying gas to the pipe comprises a blower, the blower being mounted on the housing and located outside of the liquid medium.

19. The device of claim 18, wherein the blower is connected to the pipe by a flexible hose, having a first end and a second end, the first end being affixed to an outlet portion of the blower and the second end being affixed to an inlet portion of the pipe.

20. The device of claim 1, wherein the housing has a width defined by the open side thereof and a length defined by a side perpendicular to the open side of the housing, the length of the housing being between about 4 feet and about 16 feet and the width of the housing being about 4 feet.

21. The device of claim 1, wherein the housing has a depth such that the pipe is spaced below the surface of the liquid medium at a distance of about 4 feet.

22. The device of claim 1 further including pontoon means for adapting the housing to float within the liquid medium.

23. A device for the aeration and circulation of a liquid medium comprising:
a housing adapted to float within the liquid medium such that a top portion thereof remains above a top surface of the liquid medium, the housing having an open bottom portion, at least one open side portion extending substantially continuously from said open bottom portion to said top portion thereof adjacent to the top surface of the liquid medium, and a plurality of remaining closed side portions comprising the remainder of said housing and extending substantially continuously from said open bottom portion to said top portion thereof, whereby said liquid medium can be caused to flow in a current into said open bottom portion and directly out of said at least one open side portion of said device to create a substantial circulation of said liquid medium therein;
a pipe affixed to the housing near the open bottom portion thereof, and forming a rectangle having a first side and a second side;
a plurality of hose portions each including a first end and a second end, the first end of the plurality of hose portions being affixed to the first side of the rectangle and the second ends of the plurality of hose portions being affixed to the second side of the rectangle such that a gas can flow into the plurality of hose portions from the pipe at the first end and the second end of the plurality of hose portions, each of the plurality of hose portions further having a wall with a plurality of pores formed therein, the plurality of pores having an average diameter of between about 0.001 inches and about 0.004 inches and being spaced apart substantially evenly throughout a length of the hose, wherein each of the plurality of hoses is formed from thermoset polymer particles distributed within a matrix of a thermoplastic binder material; and
means for supplying a gas to the pipe.

* * * * *